(12) United States Patent
Lundmark et al.

(10) Patent No.: US 9,968,212 B1
(45) Date of Patent: May 15, 2018

(54) TENSION ROD AND ROOM DIVIDER ASSEMBLY

(71) Applicants: James S. Lundmark, Barrington, IL (US); Peter J. Walters, Barrington, IL (US)

(72) Inventors: James S. Lundmark, Barrington, IL (US); Peter J. Walters, Barrington, IL (US)

( * ) Notice: Subject to any disclaimer, the term of this patent is extended or adjusted under 35 U.S.C. 154(b) by 0 days. days.

(21) Appl. No.: 15/588,116

(22) Filed: May 5, 2017

(51) Int. Cl.
*A47H 1/022* (2006.01)
*F16B 2/04* (2006.01)
*A47H 1/02* (2006.01)

(52) U.S. Cl.
CPC .............. *A47H 1/022* (2013.01); *F16B 2/04* (2013.01); *A47H 2001/0215* (2013.01)

(58) Field of Classification Search
CPC .............. Y10T 403/557; Y10T 403/43; Y10T 403/7041; A47H 1/022; A47H 2001/0215; F16B 7/0413; F16B 7/042; F16B 2/04; F16B 2/14; A63B 21/1681
USPC ............................. 211/105.1–105.6; 403/297
See application file for complete search history.

(56) References Cited

U.S. PATENT DOCUMENTS

| | | | | |
|---|---|---|---|---|
| 2,192,048 A | * | 2/1940 | Mueller | F16B 7/22 403/297 |
| 2,199,851 A | * | 5/1940 | Culver | A47H 1/102 211/104 |
| 2,290,430 A | * | 7/1942 | Heiser | E06B 9/44 285/397 |
| 2,594,605 A | * | 4/1952 | Zoppelt | A47H 1/022 211/123 |
| 2,850,304 A | * | 9/1958 | Wagner | E04G 7/20 256/65.15 |
| 2,952,484 A | * | 9/1960 | Zoltok | E04H 12/08 403/297 |
| 2,997,317 A | * | 8/1961 | Scott | E04G 7/20 285/397 |
| 3,110,506 A | * | 11/1963 | O'Brien | B60P 7/15 211/105.6 |
| 3,161,264 A | * | 12/1964 | Isaacson | A47B 96/1425 248/351 |
| 3,437,362 A | * | 4/1969 | Offenbroich | F16B 7/0413 279/2.12 |
| 3,484,830 A | * | 12/1969 | Wagner | F16B 7/0413 285/397 |
| 3,514,135 A | * | 5/1970 | Cooper | F16B 7/0413 285/370 |

(Continued)

*Primary Examiner* — Patrick D Hawn
(74) *Attorney, Agent, or Firm* — Charles F. Meroni, Jr.; Meroni & Meroni, P.C.

(57) ABSTRACT

An improved tension rod having a first thin-wall metal tube, a plastic bushing inserted inside the first metal tube, a second thin-wall metal tube the second metal tube set partially inside the first metal tube, a helically-wound metal spring with an eyelet on one end and a two closed coils on the other end, the metal spring retained inside the first metal tube by a first diameter metal rivet and in the second metal tube by a second diameter metal rivet, the second metal tube having an end cap on the end opposite the first metal tube, a third metal tube being an extension tube connected to the first metal tube by an expansion clamp located between the first metal tube and the extension tube, the extension tube having an end cap located opposite the first metal tube.

19 Claims, 19 Drawing Sheets

(56) References Cited

U.S. PATENT DOCUMENTS

| | | | | |
|---|---|---|---|---|
| 3,570,412 | A * | 3/1971 | Holman, Jr. | B60P 7/15 211/105.6 |
| 3,674,294 | A * | 7/1972 | Kirkham | F16B 7/14 248/414 |
| 3,982,723 | A * | 9/1976 | Ford | F16K 7/07 251/5 |
| 4,344,719 | A * | 8/1982 | Thom | E04F 11/1817 403/297 |
| 4,657,426 | A * | 4/1987 | Targetti | F16B 7/0413 403/295 |
| 4,671,478 | A * | 6/1987 | Schoenig | F16B 7/0413 16/19 |
| 4,859,109 | A * | 8/1989 | Targetti | F16B 7/0413 403/297 |
| 4,958,953 | A * | 9/1990 | Charondiere | B29C 66/63 403/295 |
| 5,026,096 | A * | 6/1991 | Lutz, II | F16L 21/002 285/114 |
| 5,061,000 | A * | 10/1991 | Haugen | B60P 3/42 285/404 |
| 5,104,269 | A * | 4/1992 | Hardison | B61D 45/00 211/105.3 |
| 5,203,135 | A * | 4/1993 | Bastian | F16B 7/0413 403/292 |
| 5,480,121 | A * | 1/1996 | Rice | E01F 9/635 248/548 |
| 5,642,957 | A * | 7/1997 | Lange | F16B 7/0413 403/292 |
| 5,657,604 | A * | 8/1997 | Malott | F16B 7/0473 403/252 |
| 5,702,010 | A * | 12/1997 | Liang | A47G 25/0685 211/105.1 |
| 5,860,253 | A * | 1/1999 | Lapointe | G09F 7/18 248/548 |
| 5,893,675 | A * | 4/1999 | Lange | F16B 7/0413 403/292 |
| 6,216,413 | B1 * | 4/2001 | Lapointe | G09F 7/18 248/548 |
| 6,257,797 | B1 * | 7/2001 | Lange | A47B 47/0016 403/292 |
| 6,874,971 | B2 * | 4/2005 | Albaugh | F16B 2/04 403/297 |
| 8,215,501 | B2 * | 7/2012 | Trettin | A47K 3/38 211/105.2 |
| 8,235,623 | B2 * | 8/2012 | Wagner | E04F 11/1836 403/297 |
| 8,333,531 | B1 * | 12/2012 | Wei | A63B 21/1681 403/297 |
| 8,479,932 | B2 * | 7/2013 | Carney | A47H 1/022 211/105.5 |
| 8,505,129 | B2 * | 8/2013 | Parker | A47H 1/022 211/105.1 |
| 8,505,749 | B2 * | 8/2013 | Trettin | A47K 3/38 211/105.2 |
| 8,925,747 | B1 * | 1/2015 | Hanley | A47H 1/022 211/105.6 |
| 9,016,974 | B2 * | 4/2015 | Coote | A63B 9/00 403/297 |
| 9,366,022 | B2 * | 6/2016 | Frey | E04B 1/5831 |
| 2004/0120757 | A1 * | 6/2004 | Ellbogen | A47H 1/02 403/223 |
| 2005/0008431 | A1 * | 1/2005 | Albaugh | F16B 2/04 403/297 |
| 2006/0218717 | A1 * | 10/2006 | van den Bosch | A47K 3/38 4/558 |
| 2007/0031187 | A1 * | 2/2007 | McNeal | A47F 5/14 403/297 |
| 2007/0206989 | A1 * | 9/2007 | Wagner | E04F 11/1836 403/297 |
| 2011/0001315 | A1 * | 1/2011 | Fischer | E04H 15/60 285/31 |
| 2012/0285914 | A1 * | 11/2012 | Carney | A47H 1/022 211/123 |
| 2013/0005538 | A1 * | 1/2013 | Coote | A63B 9/00 482/33 |
| 2013/0117926 | A1 * | 5/2013 | Parker | A47H 1/022 4/610 |
| 2014/0131299 | A1 * | 5/2014 | Didehvar | A47H 1/022 211/105.2 |

* cited by examiner

TENSION ROD AND ROOM DIVIDER ASSEMBLY

This application claims the benefit of provisional application No. 62/332,952 filed 6 May 2016.

FIELD OF THE INVENTION

The present invention generally relates to tension rods often used to support curtains or room dividers.

BACKGROUND

Tension rods have been used for many years to support curtains or room dividers. Typically, tension rods differ from curtain rods as tension rods generally don't require extra structural hardware, like hanging brackets, to hold and connect the rod to the wall. Instead, tension rods generally contain spring-loaded mechanisms that create an outwardly-projecting force within the rod to allow the two ends of the tension rod to press against two vertical surfaces or walls which support the tension rod and the curtain or room divider without the need for additional structural support. In the case of a traditional curtain rod (in cases of curtains or drapes used to cover windows or openings) generally a curtain rod is used because of the desire to provide movable covering of windows or openings. In curtain rod constructions, support brackets are placed in generally-regular and short spacing to support the curtain rod properly against a wall.

When a curtain or room divider is wanted to span between two walls for the sake of creating two temporary spaces out of one larger space, a curtain rod with occasionally-spaced support brackets from the ceiling may be used; however, the curtain or room divider may not be opened fully because of the connecting support brackets from the ceiling. In the past, tension rods have been used to minimize the need for support brackets in the ceiling. Tension rods work well due to a high-tension helically-wound spring located inside of two metal tubes of differing but concentric diameters. When used, the unsupported tension rod may allow the full opening of the curtain near the support walls, this enables one to turn the divided space back into one larger space. Generally, to keep costs and weight down, tension rods are made of thin-walled (0.020" or 0.05 mm) steel tubing. Decorative and supportive end caps are generally cast of machined metal with rubber compression pads situated between the support wall and end cap.

However, there are several shortcomings in current tension rod technology. Because of structural limitations of commercially-available designs, tension rods are generally designed for a maximum span of approximately 10 foot (3.05 meters) between walls. In many places around the world, a room span of 12 feet (3.66 meters) has become more the norm. Therefore there is a need for a tension rod capable of addressing a 12-foot or longer span. Because tension rods are generally shipped from a retailer to the user via a shipper like United States Postal Service, United Parcel Services, FedEx, and DHL, length of the shipping package can be a factor in economical shipping. Recent changes have shortened the length of shipping boxes with the said shippers from 72 inches (183 cm) max to 60 inches (152 cm) max without a significant increase in shipping costs. However, the actual length of a ready-to-ship tension rod needs to be closer to 58 inches due to the inner dimension of a 60-inch long shipping box plus a potential inner retail box (147.3 cm). Many of the currently-produced tension rods will not fit under this constraint even after full collapse of the tension rod. Moreover, a collapsed-for-shipping tension rod to span a 12.5 foot-150-inch (366 cm) space, as discussed above, would not be able to come under the new maximum shipping length. Conventional Tension Rod technology for a 10 foot-120-inch (304.8 cm) Tension Rod has a ready-to-ship collapsed length of 64.5 inches (163.8 cm) while a 12.5 foot-150 inches (381 cm) Tension Rod would have a ready-to-ship collapsed length of 79.5 inches (201.9 cm). Therefore there is a need to keep both 10-foot and 12.5-foot tension rods under the maximum length for shipping yet span the long spans desired with a newly-designed shorter tube length plus an extension tube system.

In addition, when creating a tension rod of longer span while minimizing the addition of weight creates challenges in keeping the tension rod from bending excessively when a longer rod is loaded with the additional curtain or divider fabric to span the additional distance in longer rods. Thus there is a need for a tension rod that traverses a longer span without additional bending of the rod due to the span and weight of the additional materials.

Current tension rod systems typically comprise of eight parts assembled into one functioning mechanism. Generally, tension rods are limited to short span differences due to the limitations of the compressed spring. In the past, different tension rod system sizes could be made to address the needs of various spans such as: 28-48 inches (71-122 cm), 48-80 inches (122-203 cm), or 80-120 inches (203-305 cm). This would be achieved with the use of different length components in a similar method of assembly and function. However, these parts are changed for each size or rod, therefore there is a need for a tension rod system that allows both systems to have the same exact parts except for one change part to address difference in length while providing both to ship economically under shipper's maximum length constraints.

In addition, in long-gap applications, a connector is needed to connect the main tension rod subassembly with the with a cap assembly. Past connectors used for tension rods have been metal rods or expansion clamp technologies. Solid metal rod systems are inexpensive connectors but they have issues with fitting properly due to the variation in the size of the connector outer diameter and inner diameter of the corresponding tubes. If too tight, it's difficult to insert; if too loose, it can result in excessive sag of the tension rod. Expansion clamps are more robust as they have two half-round shaped parts that expand outward when set screws are used to force the two main parts to move outwardly against the inner surface of the tubes. The issue with the current expansion clamps is that they have intricate, difficult-to-machine interlocking surfaces that may separate when initially inserted into the tension rod tube. Thus there is a need for an improved expansion clamp.

An issue with current tension rod designs is that they are limited to a maximum of about 54 in-lbs of force before the internal spring fails. Spring failure could result in the tension rod to not produce needed compressive forces to support the tension rod and room divider. Thus there is a need for a more robust spring design. Current tension rod technology generally only has a one-inch optimum range for spring compression in the assembly. This optimum range is the difference between minimum force to support the tension rod and room divider assembly to a wall and the maximum force before spring failure. In addition, past springs generally have failed to provide the proper outside of a small range of insertions, thus there is also a need for a spring that has a greater range of applications.

These problems, and others, have been addressed by the improved tension rod and room divider discloser herein and discussed in greater detail below.

BRIEF SUMMARY

Currently-available tension rods generally have a common construction of eight components: 1) metal End Cap for 0.625 inch outer diameter tube with set screws and rubber compression pad; 2) metal End Cap for 0.750 inch outer diameter tube with set screws and rubber compression pad; 3) one thin-wall metal Tube with 0.625 inch outer diameter; 4) one thin-wall metal tube with 0.750 inch outer diameter; 5) one annular plastic bushing; 6) one helically-wound metal spring with an eyelet on one end and a two closed coils on the other end; 7) one metal rivet to retain spring inside of the 0.750 inch diameter tube; 8) one metal rivet to contact the metal spring inside of the 0.625 inch outer diameter metal tube.

The Improved Tension Rod construction according to the present disclosure, consists of ten components: 1) metal End Cap for 1.000 inch outer diameter tube with three set screws and rubber compression pad; 2) metal End Cap for 0.875 inch outer diameter tube with three set screws and rubber compression pad; 3) one thin-wall metal Tube with 1.000 inch outer diameter; 4) one thin-wall metal tube with 0.875 inch outer diameter; 5) one annular plastic bushing; 6) one helically-wound metal spring with an eyelet on one end and a two closed coils on the other end; 7) one metal rivet to retain spring inside of the 0.875 inch outer diameter tube; 8) one metal rivet to contact the metal spring inside of the 1.000 inch metal tube; 9) one thin-wall metal Extension Tube with 1.000 inch outer diameter; 10) one metal Expansion Clamp subassembly consisting of one Top Clamp, one Bottom Clamp, and four set screws.

In function, an Improved Tension Rod relies on compression of the internal spring when the tension rod assembly is collapsed and released between two fixed, rigid, generally-vertical surfaces like a Conventional Tension Rod. Using an inwardly-applied force on the assembly compresses the spring for application to the two vertical surfaces.

The advantages of such an application become clear when one is experienced in tension rod and other hanging technology. Typical devices currently on the market do not have the confluence and plethora of features contemplated and described herein.

In a first embodiment the disclosure contemplates an apparatus comprising a first thin-wall metal tube having a first outer diameter, a plastic bushing inserted inside the first metal tube, a second thin-wall metal tube having a second outer diameter, the second metal tube set partially inside the first metal tube, a helically-wound metal spring with an eyelet on one end and a two closed coils on the other end, the metal spring retained inside the first metal tube by a first diameter metal rivet and in the second metal tube by a second diameter metal rivet, the second metal tube having an end cap on the end opposite the first metal tube, a third metal tube being an extension tube, the extension tube having an outer diameter equal to the first outer diameter and connected to the first metal tube by an expansion clamp located between the first metal tube and the extension tube; the extension tube having an end cap located opposite the first metal tube.

In another embodiment the disclosure contemplates an expansion clamp comprising a top clamp, the top clamp being a semi-circle with a plurality of holes located on the exterior of the top clamp and penetrating to the interior, a bottom clamp, the bottom clamp being a semi-circle with a plurality of inward-facing threaded screw receivers, said screw receivers being elevated from the interior of the bottom clamp of the expansion clamp, the inward-facing screw receivers capable of being aligned with the plurality of holes located on the top clamp; and a plurality of set screws matable with the plurality of holes located on the top clamp and the plurality of threaded screw receivers located on the bottom clamp and securably mating the top and bottom clamps forming the expansion clamp.

In another embodiment the disclosure contemplates a method of assembling a tension rod, the method comprising, providing a first thin-wall metal tube having a first outer diameter, a second thin-wall metal tube having a second outer diameter, a helically-wound metal spring with an eyelet on one end and a two closed coils on the other end, a third metal tube being an extension tube, the extension tube having an outer diameter equal to the first outer diameter, and an expansion joint, positioning the expansion joint between the first metal tube and the extension tube and securing the first metal tube to the extension tube, positioning the spring inside the first metal tube and second metal tube and securing the spring in place within the first metal tube and second metal tube with rivets, thereby assembling the tension rod.

Such embodiments do not represent the full scope of the invention. Reference is made therefore to the claims herein for interpreting the full scope of the invention. Other objects of the present invention, as well as particular features, elements, and advantages thereof, will be elucidated or become apparent from, the following description and the accompanying drawing figures.

DESCRIPTION OF THE DRAWINGS

The present invention may be better understood, and its numerous objects, features, and advantages made apparent to those skilled in the art by referencing the accompanying drawings.

DETAILED DESCRIPTION

Referring now the drawings with more specificity, the present invention essentially provides an improved tension rod assembly and apparatus. The preferred embodiments of the present invention will now be described with reference to FIGS. 1-13 of the drawings. Variations and embodiments contained herein will become apparent in light of the following descriptions.

Figure 1:
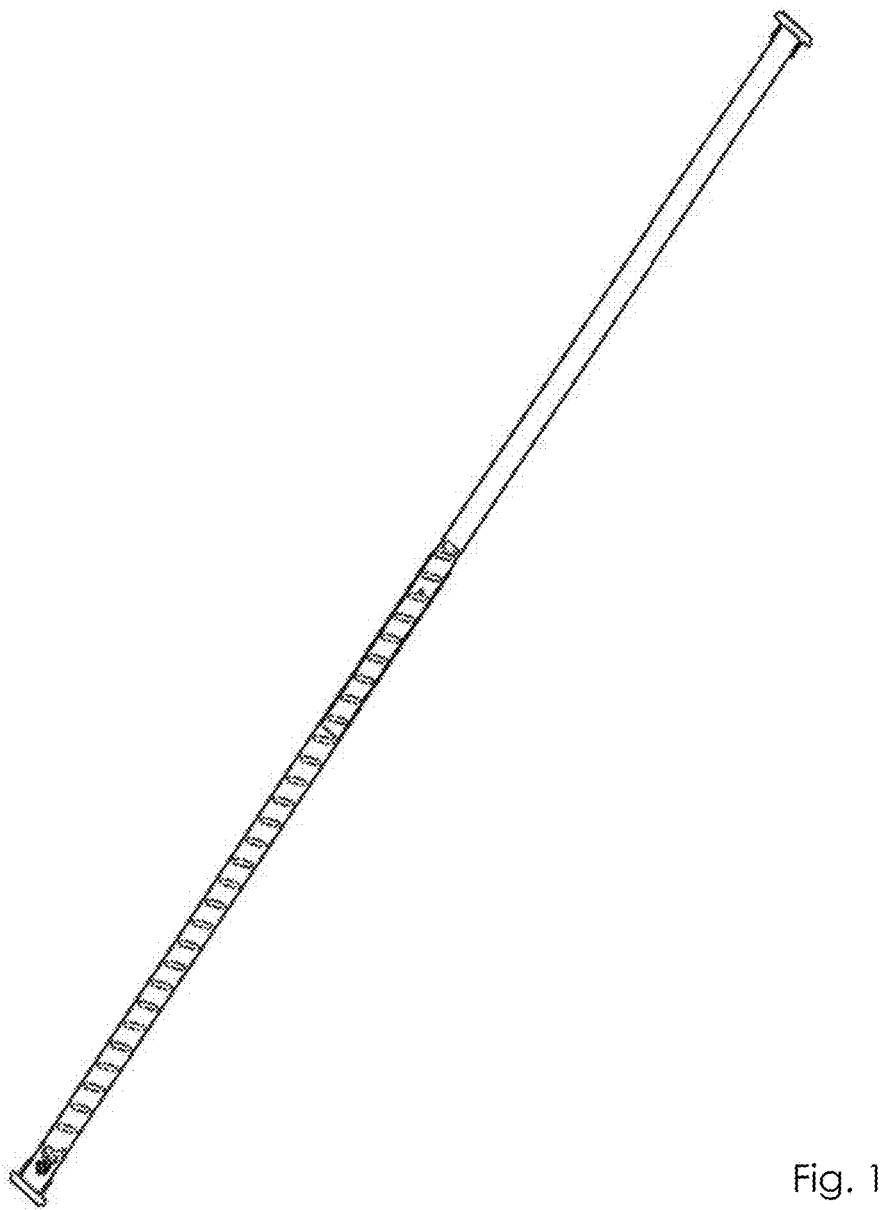
FIG. 1 is a section view of a conventional tension rod.
Figure 2:
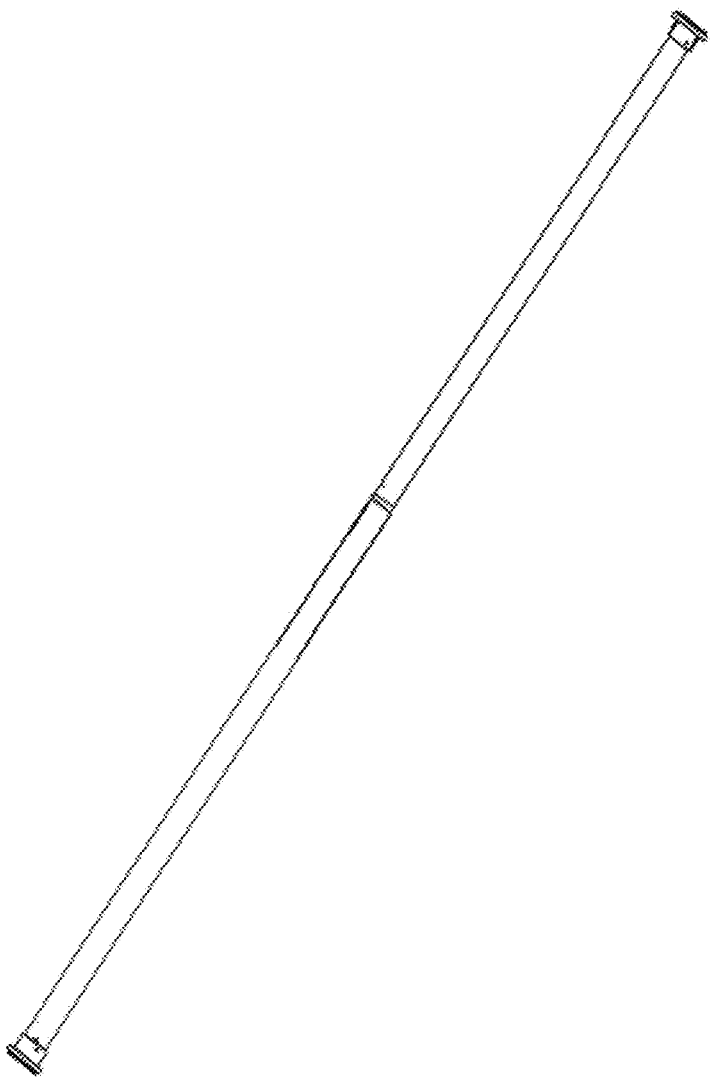
FIG. 2 is a perspective view of a conventional tension rod as in FIG. 1.

Looking now to FIGS. 1 & 2 a conventional tension rod device is depicted. In FIG. 1 the tension rod 100 is shown in a sectioned view. As can be seen fully in both FIGS. 1 & 2 a typical tension rod generally only consists of relatively few features such as two rods and a spring.

Figure 3:
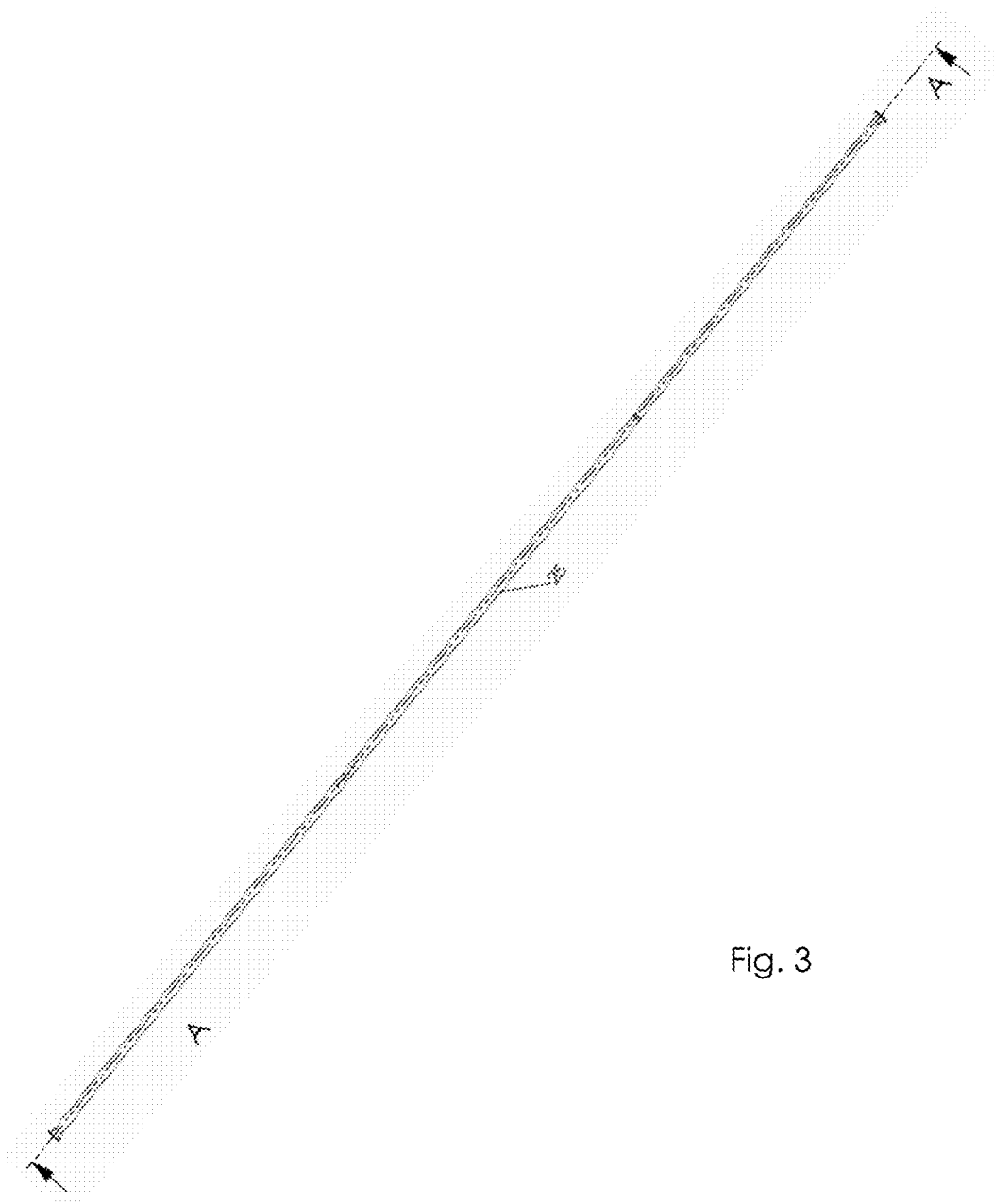
FIG. 3 is a perspective view of a representative improved tension rod according to the present disclosure.
Figure 4:
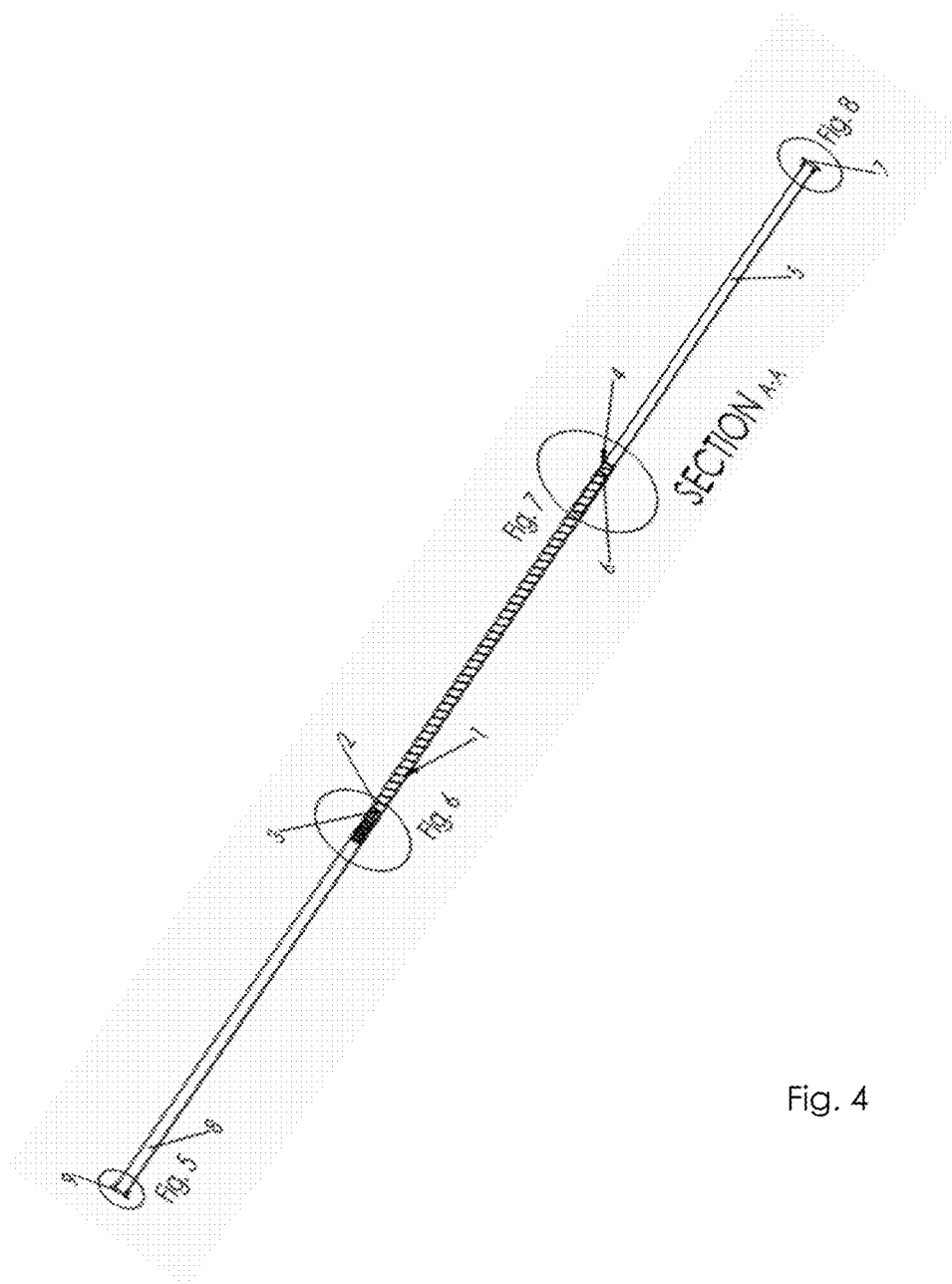
FIG. 4 is a sectioned view of a representative improved tension rod according to the present disclosure.

Turning now to FIG. 3, an improved tension rod apparatus 25 according to the present disclosure is shown. As shown in FIG. 4 a sectioned view across line A-A tension rod 25 is made up, essentially of a spring 1, a large diameter tube 2 (preferably a 1.000" outer diameter), a large tube rivet 3, plastic grommet 4, a small diameter tube 5 (preferably a 0.875" outer diameter), a small tube rivet 6, end cap 7, extension tube 8 (preferably a 1.000" outer diameter), end cap 9, expansion clamp 10, and set screws 11.

Figure 5:
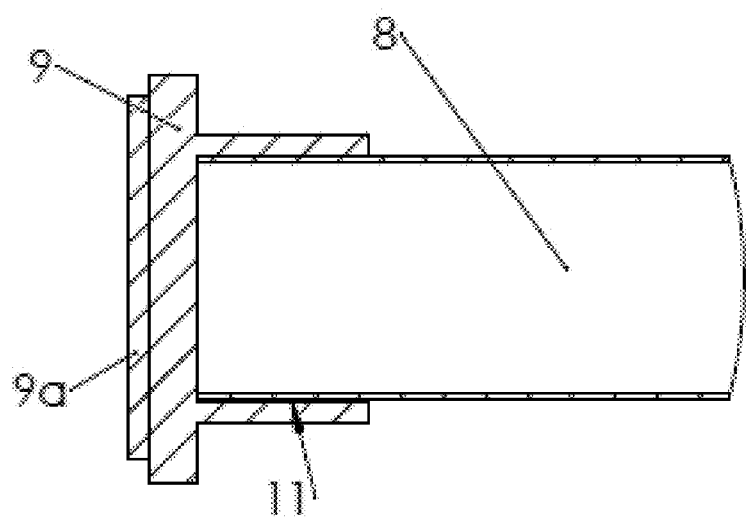
FIG. 5 is a side-view of a first end of a representative improved tension rod according to the present disclosure.

FIG. 5 depicts a detailed view of the left end of tension rod apparatus 25. Here extension tube 8 contacts end cap 9 and can be secured via Allen head set screws 11. Typically, three (3) screws are utilized to balance weight and strength concerns. In most embodiments, end cap 9 will also incorporate rubber head 9a which increases friction between the rod and the wall, and can reduce damage to a wall or other surface the apparatus 25 is placed against.

Figure 6:
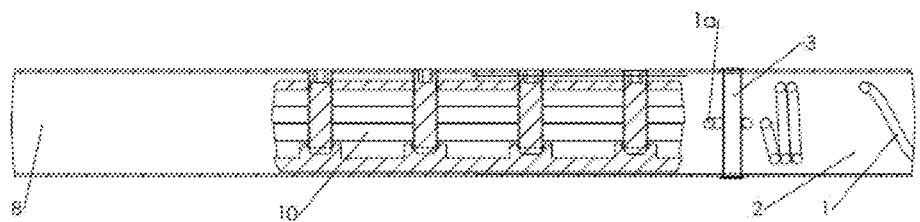
FIG. 6 is a side-on-sectioned view of the connection area of a representative improved tension rod according to the present disclosure.

FIG. 6 depicts a detailed view of a center portion of tension apparatus 25 where large diameter tube 2 meets extension tube 8 and are connected by expansion clamp 10. Typical tension rods as shown in FIGS. 1 & 2 do not have such a joint. As may be clear, this joint typically is near the rivet 3 in tube 2 which marks a terminus of spring 1. Turning, briefly to FIGS. 9-13 novel expansion clamp 10 is shown in greater detail. Clamp 10 is made up of two portions a top portion 10a and a bottom portion 10b. Both portions are semi-circles and joint together make up a cylindrical joint. The top potion 10a will typically have pre-drilled holes that can fit Allen screws 10c. Bottom portion 10b will also have screw receivers 10d that are threaded such that the Allen screws 10c can torque down to tighten the joint depicted in FIG. 6. As shown best in FIG. 12, screws 10c should not protrude from either the top or bottom of expansion clamp 10 when fully fastened. Indeed, bottom portion 10b typically will not have holes so a solid backstop will be provided to prevent overturning. As may be best seen in FIG. 13, in a preferred embodiment the top 10a and bottom 10b portions of the clamp 10 have triangular protrusions 10e and indents/channels 10f which result in a tighter, no-slip fit.

Figure 7:
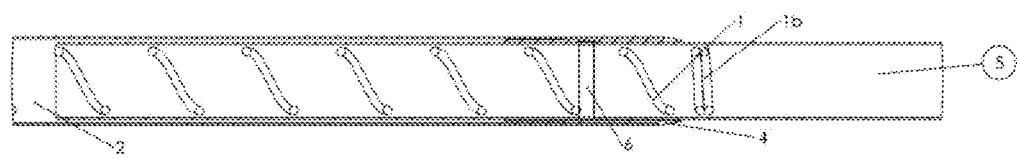
FIG. 7 is a side-on-sectioned view of the sliding connection area of a representative improved tension rod according to the present disclosure.

Looking now to FIG. 7, a portion of apparatus 25 where spring 1 is held in place inside of small-diameter tube 5 is shown. This is accomplished by rivet 6 securing the end of the spring 1 in place. Also shown in this joint is plastic grommet 4 which is held in place by a friction fit.

Figure 8:
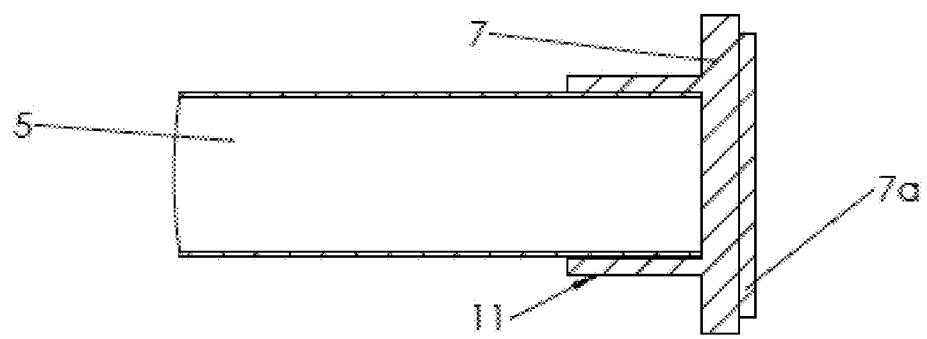
FIG. 8 is a side-view of a second end of a representative improved tension rod according to the present disclosure.
Figure 9:
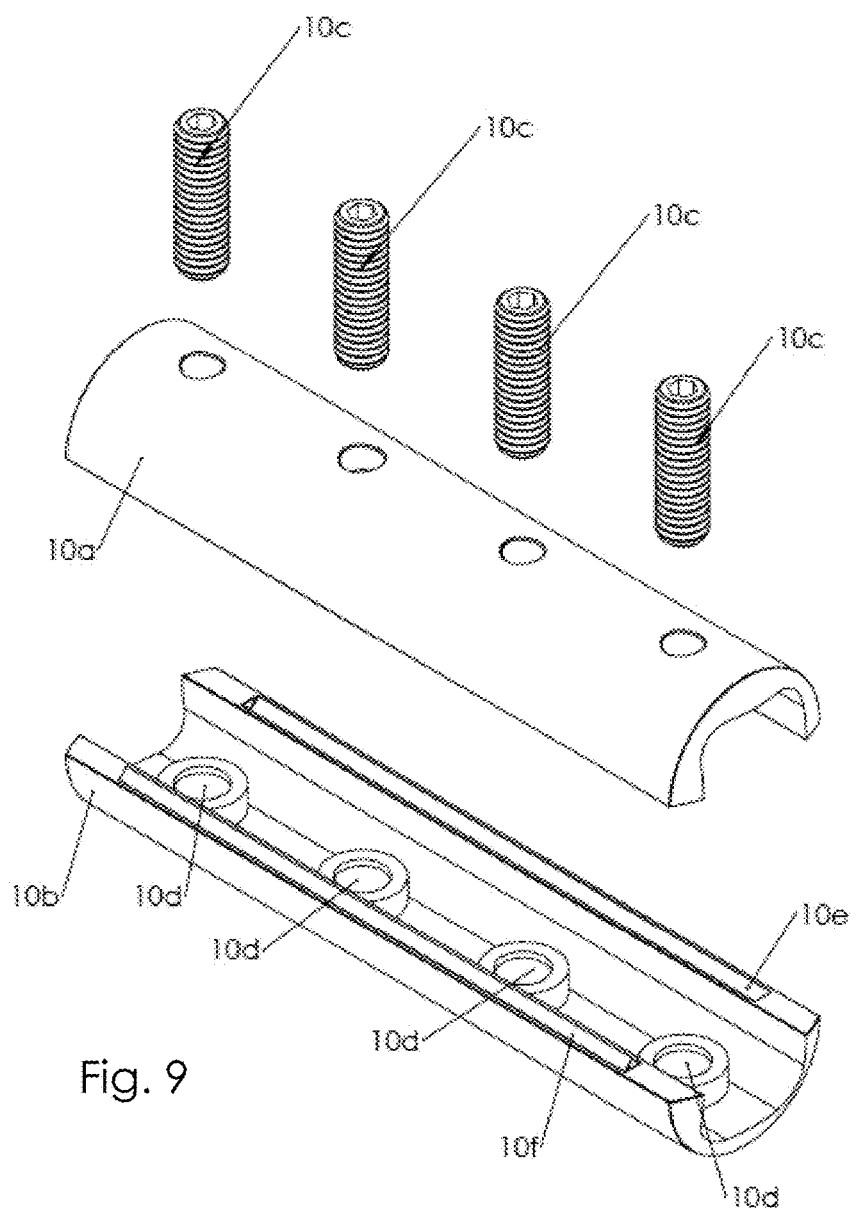
FIG. 9 is an exploded view of an improved expansion clamp according to the present disclosure.
Figure 10:
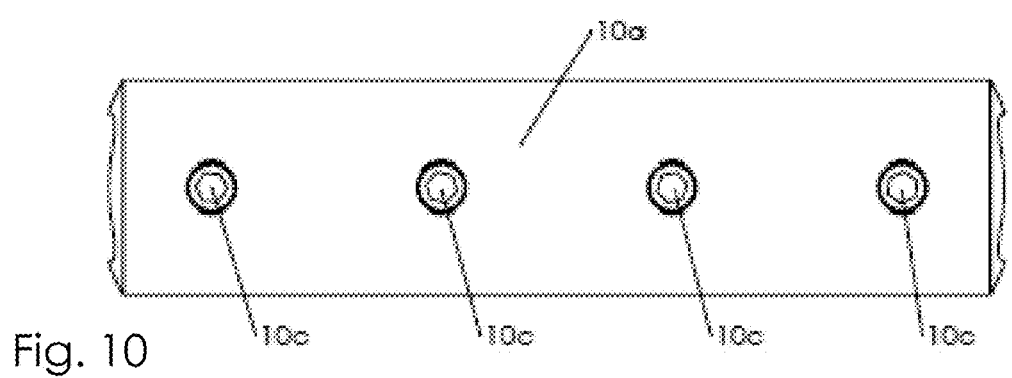
FIG. 10 is a top-side-view of the improved expansion clamp of FIG. 9.
Figure 11:
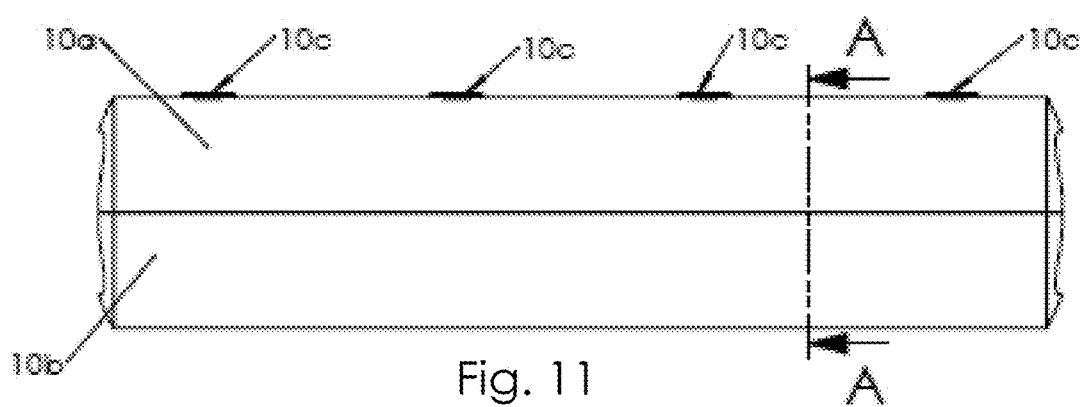
FIG. 11 is a bottom-side-view of the improved expansion clamp of FIG. 9.
Figure 12:
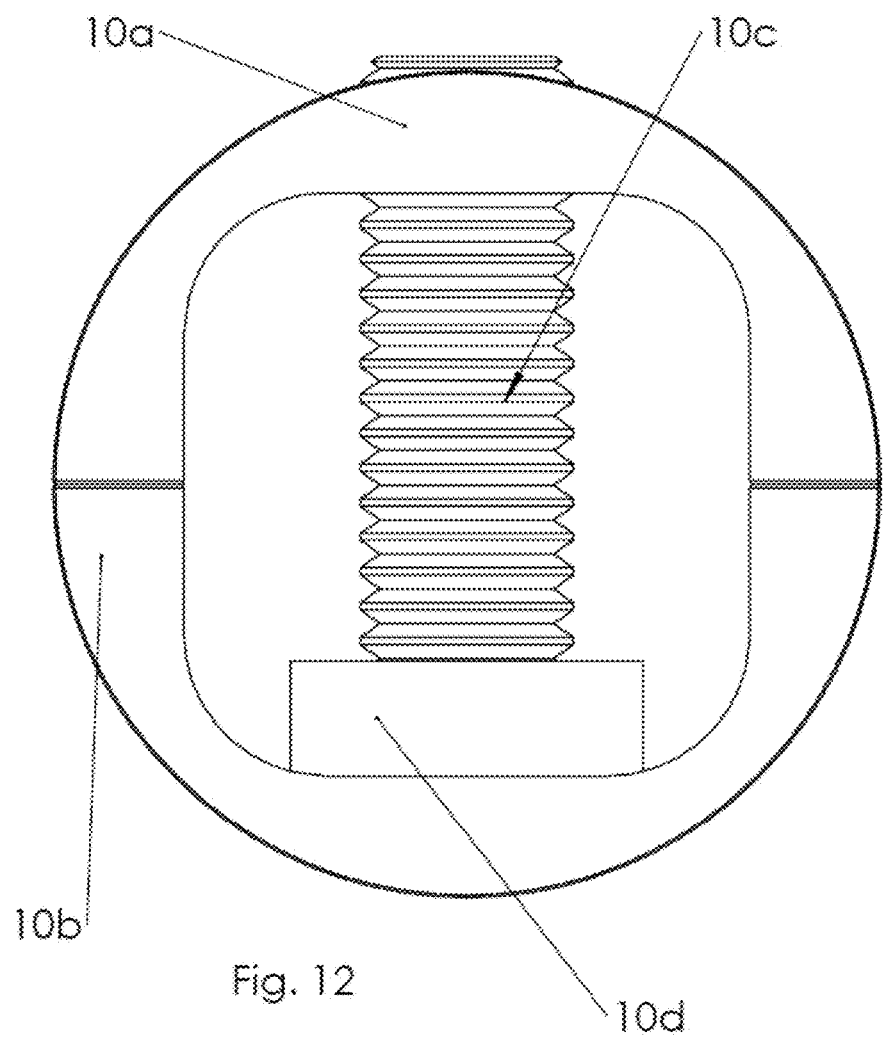
FIG. 12 is a section-view of the improved expansion clamp of FIG. 9.

FIG. 8 depicts a detailed view of the right end of tension rod apparatus 25. Here small diameter tube 5 contacts end cap 7 and can be secured via Allen head set screws 11. Typically, three (3) screws are utilized to balance weight and strength concerns. In most embodiments, end cap 7 will also incorporate rubber head 7a which increases friction between the rod and the wall, and can reduce damage to a wall or other surface the apparatus 25 is placed against.

Figure 13:
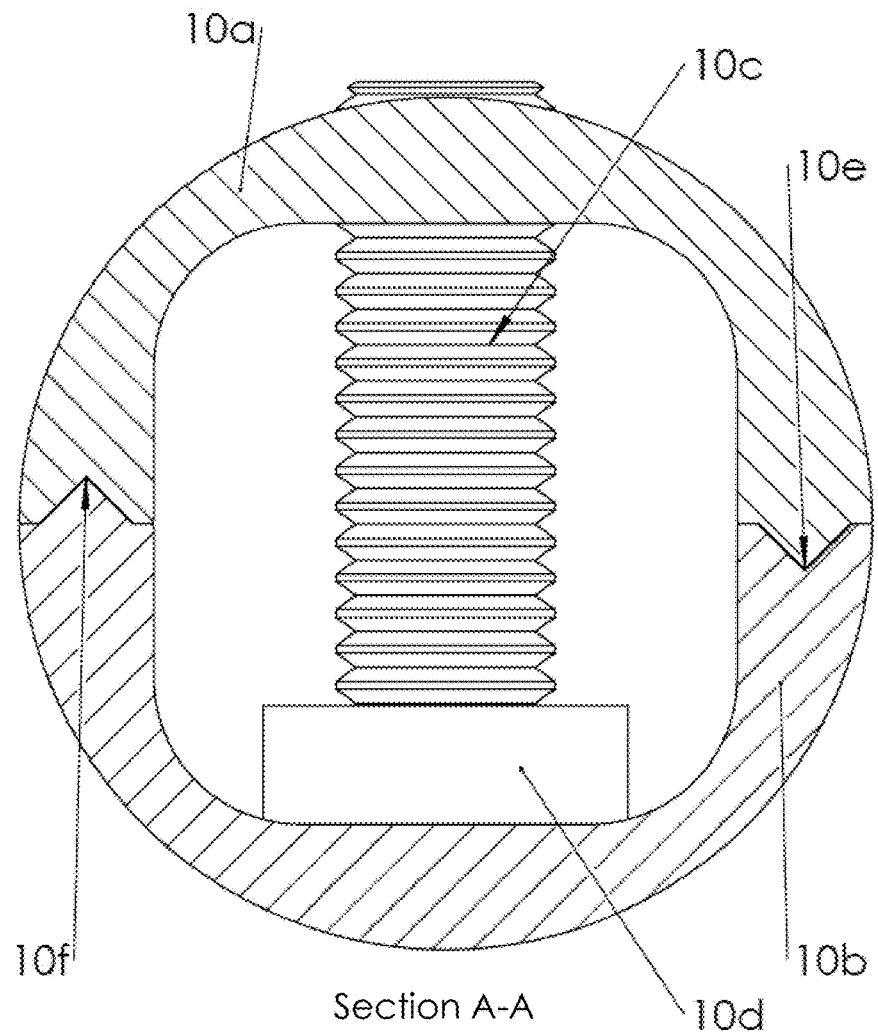
FIG. 13 is a reverse-angle-section-view of the improved expansion clamp of FIG. 12.
Figure 14:
FIG. 14 is a perspective view of another embodiment of an improved tension rod according to the present disclosure.
Figure 15:
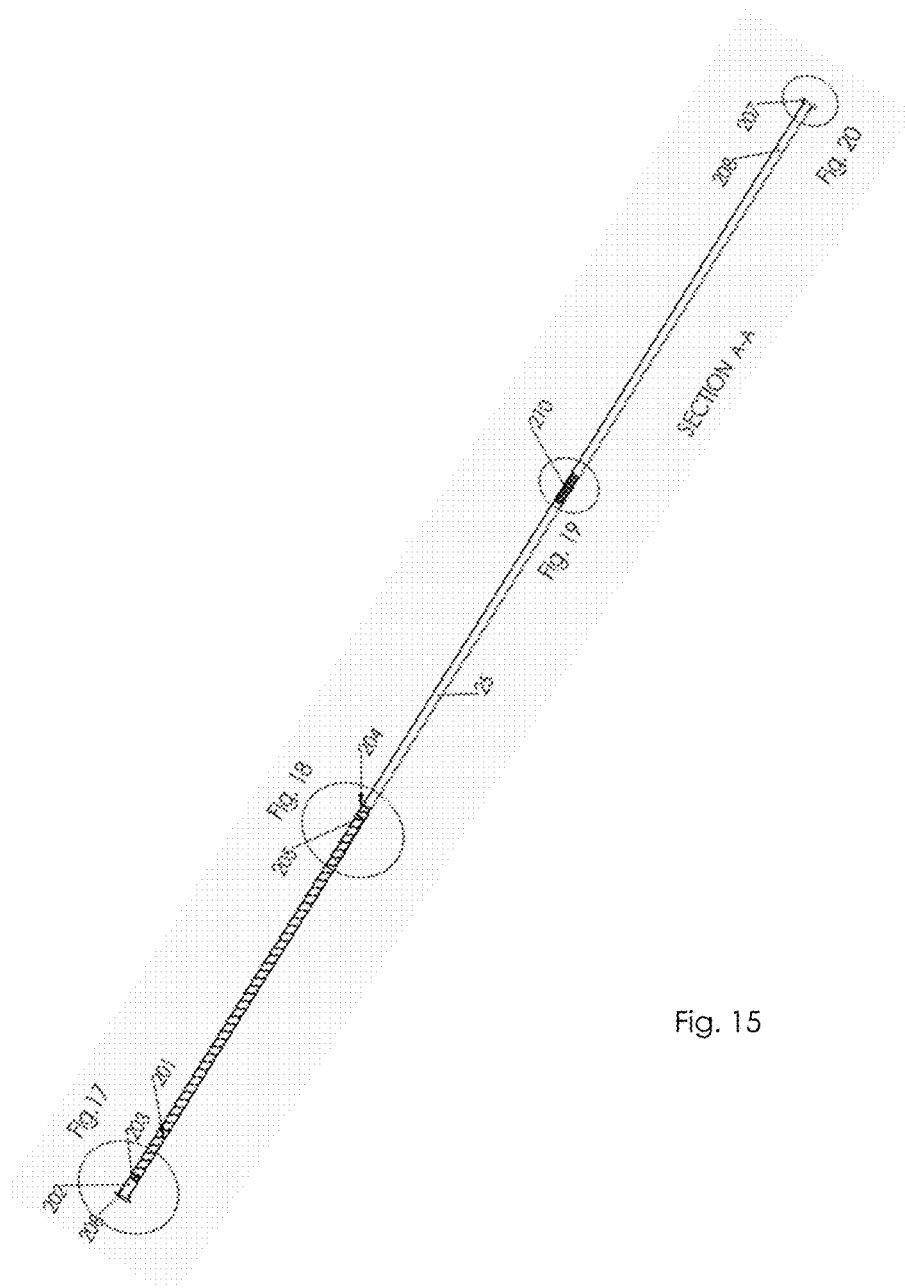
FIG. 15 is a sectioned view of the improved tension rod of FIG. 14 according to the present disclosure.

Turning now to FIG. 13, second embodiment of an improved tension rod apparatus 200 according to the present disclosure is shown. As shown in FIG. 15 a sectioned view across line A-A tension rod 200 is made up, essentially of a spring 201, a large diameter tube 202 (preferably a 1.000" outer diameter), a large tube rivet 203, plastic grommet 204, a small diameter tube 205 (preferably a 0.875" outer diameter), a small tube rivet 206, end cap 207, extension tube 208 (preferably a 0.875" outer diameter), end cap 208, and expansion clamp 210.

Figure 16:
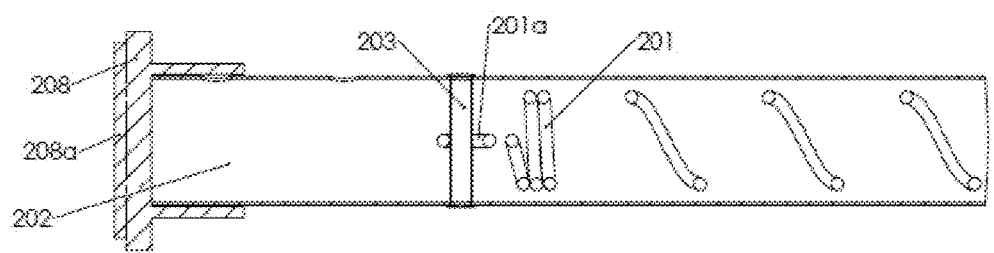
FIG. 16 is a side-view of a first end of the improved tension rod of FIG. 15 according to the present disclosure.

FIG. 16 depicts a detailed view of the left end of tension rod apparatus 200. Here large diameter tube 2 contacts end cap 208. In most embodiments, end cap 208 will also incorporate rubber head 208a which increases friction between the rod and the wall, and can reduce damage to a wall or other surface the apparatus 200 is placed against. As can be seen, in this embodiment, rivet 203 is located next to spring eyelet 201.

Figure 17:
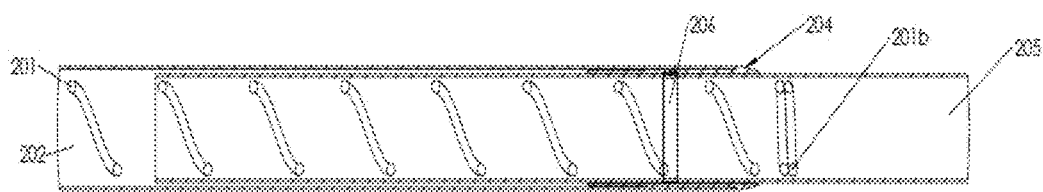
FIG. 17 is a side-on-sectioned view of the sliding connection area of the improved tension rod of FIG. 15 according to the present disclosure.
Figure 18:
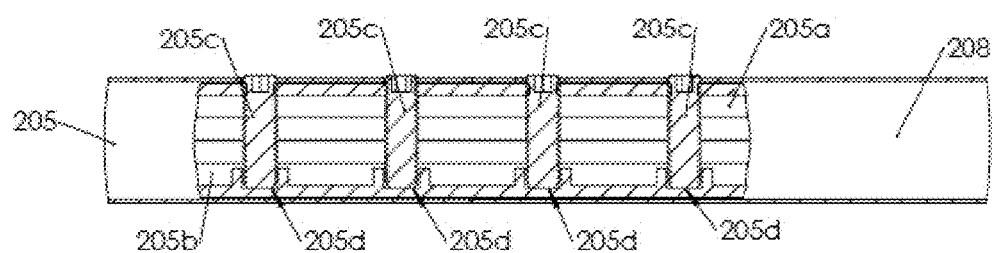
FIG. 18 is a side-on-sectioned view of the sliding connection area of the improved tension rod if FIG. 15 according to the present disclosure.

FIG. 17 depicts a detailed view of a center portion of tension apparatus 200 where large diameter tube 202 meets small diameter tube 205. Spring 201 is held in place inside of small-diameter tube 205 is shown by rivet 206 securing the end of the spring 201 in place. As can be seen, in this embodiment spring double coil 201b is at this portion of the apparatus 206. Also shown in this joint is plastic grommet 204 which is held in place by a friction fit FIG. 18 depicts the portion of device 200 where extension tube 208 connects to small diameter tube 205. These are connected by expansion clamp 210. As may be clear, this joint typically is near the rivet 206 in tube 205 which marks a terminus of spring 201. A similar clam to clamp 210 is shown in greater detail in FIGS. 9-13. In this embodiment, clamp 210 is made up of two portions a top portion 210a and a bottom portion 210b. Both portions are semi-circles and joint together make up a cylindrical joint. The top potion 210a will typically have pre-drilled holes that can fit Allen screws 210c. Bottom portion 210b will also have screw receivers 210d that are threaded such that the Allen screws 210c can torque down to tighten the joint.

Figure 19:
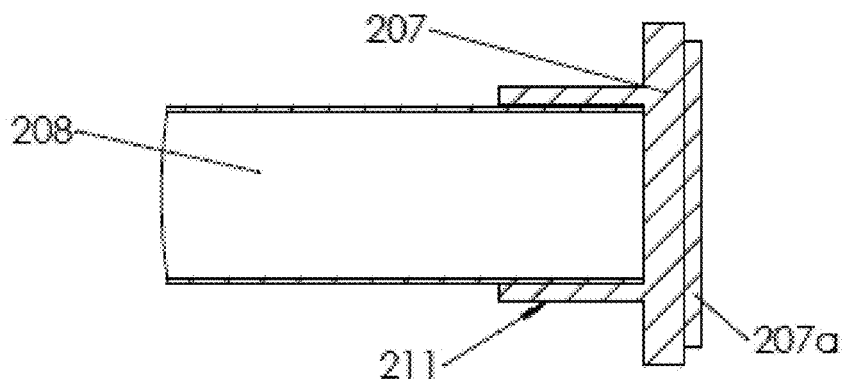
FIG. 19 is a side-view of a second end of the improved tension rod of FIG. 15 according to the present disclosure

FIG. 19 depicts a detailed view of the right end of tension rod apparatus 200. Here small diameter extension tube 208 contacts end cap 207 and can be secured via Allen head set screws 211. Typically, three (3) screws are utilized to balance weight and strength concerns. In most embodiments, end cap 207 will also incorporate rubber head 207a which increases friction between the rod and the wall, and can reduce damage to a wall or other surface the apparatus 200 is placed against.

INDUSTRIAL APPLICABILITY AND CONSTRUCTION

In some instances the apparatus 25 according to the present disclosure is constructed to specifications to deal with the issues associated with traditional tension rods 100 as discussed herein. To that end construction of apparatus 25 preferably takes a first thin-wall metal tube 2 having a first outer diameter (preferably 1.000"), a plastic bushing 4 inserted inside the first metal tube 2; a second thin-wall metal tube 5 having a second outer diameter (preferably 0.875"), the second metal tube 5 set partially inside the first metal tube 2. Inside tubes 2 & 5 a helically-wound metal spring 1 with an eyelet 1a on one end and a two closed coils 1b on the other end, the metal spring retained inside the first metal tube 2 by a first diameter metal rivet 3 and in the second metal tube 5 by a second diameter metal rivet 8. Unique to this tension rod apparatus 25, the spring 1 has between forty five (45) and fifty one (51) coils (preferably 48) and the eyelet 10a preferably has a radius of between 2 and 4 millimeters (mm). As discussed the second metal tube 5 preferably has an end cap 7 on the end opposite the first metal tube 1. Then a third metal tube 8, being an extension tube, the extension tube 8 having an outer diameter equal to the first outer diameter of the first tube and connected to the first metal tube 2 by an expansion clamp 10 located between the first metal tube 2 and the extension tube 8. The extension tube 8 has an end cap 9 located opposite the first metal tube 2. End caps 7 & 9 are preferably constructed of three set screws 11 and rubber compression pad (7a, 9a).

The construction of the expansion clamp 10 discussed in greater detail. A top clamp, the top clamp 10a being a semi-circle with a plurality of holes (preferably 4) located on the exterior of the top clamp and penetrating to the interior. The Top clamp 10a is in cooperation with a bottom clamp 10b, the bottom clamp 10b being a semi-circle with a plurality of inward-facing threaded screw receivers 10d (preferably four), said screw receivers 10d being elevated from the interior of the bottom clamp 10b of the expansion clamp 10, the inward-facing screw receivers 10d preferably being aligned with the plurality of holes located on the top clamp 10a. In addition, clamp 10 relates to a plurality (preferably four) of set screws 10c matable with the plurality of holes located on the top clamp 10a and the plurality of threaded screw receivers 10b located on the bottom clamp 10d and securably mating the top and bottom clamps forming the expansion clamp 10. In addition, screws 10c can be cooperable with holes on extension tube 8 and metal tube 2. In most embodiments, the four set screws 10c have Allen wrench heads.

As may be apparent, a general use of the apparatus 25 is for hanging a curtain or a room divider by hanging from the three metal tubes using conventional hooks, loops, or the like. As discussed above, an advantage of the apparatus 25 disclosed herein is that unlike other tension rods is capable of spanning a twelve (12) foot six (6) inch or greater span. To accomplish this, one improvement contemplated is that spring 1 can generate up to 63 in-lb spring force before failure, unlike a typical spring used in tension rod assemblies. Another advantage of the present disclosure is its improvements related to shipping. To that end, in a preferred embodiment none of the first metal tube 2, second metal tube 5, and/or extension tube 8 exceed fifty four (54) inches in length. This is in accordance with current shipping standards and is not available in other commercially available designs.

Also contemplated by this disclosure is an improved method of assembling a tension rod 25. Construction of the rod 25 discussed above preferably begins with positioning the expansion joint 10 between the first metal tube 2 and the extension tube 8 and securing the first metal tube 2 to the extension tube 8. Then positioning the spring 1 inside the first metal tube 2 and second metal tube 5 and securing the spring 1 in place within the first metal tube 2 and second metal tube 5 with rivets 3 & 6, thereby assembling the tension rod 25. In most preferred embodiments the second metal tube 5 and the extension tube 8 are capped with endcaps 7 & 9 prior to assembly of the apparatus. In addition, as discussed above securing the first metal tube 2 to the extension tube 8 typically may involve screwing Allen head set screws 10c through holes in the first metal tube 2 and the extension tube 8 and into screw receivers 10d in the expansion joint 10.

Accordingly, although the invention has been described by reference to certain preferred and alternative embodiments, it is not intended that the novel arrangements be limited thereby, but that modifications thereof are intended to be included as falling within the broad scope and spirit of the foregoing disclosures and the appended drawings.

We claim:
1. An apparatus comprising:
   a first thin-wall metal tube having a first outer diameter;
   a plastic bushing inserted inside the first metal tube;
   a second thin-wall metal tube having a second outer diameter, the second metal tube set partially inside the first metal tube;
   a helically-wound metal spring with an eyelet on one end and a two closed coils on the other end, the metal spring retained inside the first metal tube by a first diameter metal rivet and in the second metal tube by a second diameter metal rivet;
   the second metal tube having an end cap on the end opposite the first metal tube;
   a third metal tube being an extension tube, the extension tube having an outer diameter equal to the first outer diameter and connected to the first metal tube by an expansion clamp located between the first metal tube and the extension tube; the extension tube having an end cap located opposite the first metal tube; and
   a top clamp and a bottom clamp, the top clamp and the bottom clamp each having a triangular protrusion and a triangular channel.
2. The apparatus of claim 1 wherein the expansion clamp comprises:
   the top clamp being a semi-circle with a plurality of holes located on the exterior of the top clamp and penetrating to the interior;
   the bottom clamp being a semi-circle with a plurality of inward-facing threaded screw receivers, said screw receivers being elevated from the interior of the bottom clamp of the expansion clamp, the inward-facing screw receivers capable of being aligned with the plurality of holes located on the top clamp; and
   a plurality of set screws matable with the plurality of holes located on the top clamp and the plurality of threaded screw receivers located on the bottom clamp and securably mating the top and bottom clamps forming the expansion clamp.
3. The apparatus of claim 2 wherein:
   the plurality of holes located on the top clamp comprises four holes;
   the plurality of inward-facing threaded screw receivers comprises four threaded screw receivers;
   the plurality of set screws comprises four set screws.
4. The apparatus of clamp of claim 3 wherein:
   the four set screws have Allen wrench heads.
5. The apparatus of claim 4 wherein:
   the first outer diameter is 1.000 inches; and
   the second outer diameter is 0.875 inches.

6. The apparatus of claim 4, the end caps comprising:
three set screws and rubber compression pad.

7. The apparatus of claim 4, wherein the apparatus is capable of spanning a twelve (12) foot six (6) inch span.

8. The apparatus of claim 7 wherein the spring can generate up to 63 in-lb spring force before failure.

9. The apparatus of claim 8 wherein none of the first metal tube, second metal tube, and extension tube exceed fifty four (54) inches in length.

10. The apparatus of claim 1 wherein the apparatus comprises:
the top clamp being a semi-circle with a plurality of holes located on the exterior of the top clamp and penetrating to the interior;
the bottom clamp being a semi-circle with a plurality of inward-facing threaded screw receivers, said screw receivers being elevated from the interior of the bottom clamp of the expansion clamp, the inward-facing screw receivers capable of being aligned with the plurality of holes located on the top clamp; and
a plurality of set screws matable with the plurality of holes located on the top clamp and the plurality of threaded screw receivers located on the bottom clamp and securably mating the top and bottom clamps forming the expansion clamp.

11. The apparatus of claim 10 wherein:
the first outer diameter is 1.000 inches; and
the second outer diameter is 0.875 inches.

12. The apparatus of claim 11 wherein the spring can generate up to 63 in-lb spring force before failure.

13. The apparatus of claim 11 wherein none of the first metal tube, second metal tube, and extension tube exceed fifty four (54) inches in length.

14. An expansion clamp comprising:
a top clamp, the top clamp being a semi-circle with a plurality of holes located on the exterior of the top clamp and penetrating to the interior;
a bottom clamp, the bottom clamp being a semi-circle with a plurality of inward-facing threaded screw receivers, said screw receivers being elevated from the interior of the bottom clamp of the expansion clamp, the inward-facing screw receivers capable of being aligned with the plurality of holes located on the top clamp;
the top clamp and the bottom clamp each having a triangular protrusion and a triangular channel and
a plurality of set screws matable with the plurality of holes located on the top clamp and the plurality of threaded screw receivers located on the bottom clamp and securably mating the top and bottom clamps forming the expansion clamp.

15. The expansion clamp of claim 14 wherein:
the plurality of holes located on the top clamp comprises four holes;
the plurality of inward-facing threaded screw receivers comprises four threaded screw receivers;
the plurality of set screws comprises four set screws.

16. The expansion clamp of claim 15 wherein:
the four set screws have Allen wrench heads.

17. The expansion clamp of claim 15 wherein:
wherein the apparatus is capable of spanning a twelve (12) foot six (6) inch span, the spring can generate up to 63 in-lb spring force before failure; and
wherein none of the first metal tube, second metal tube, and extension tube exceed fifty four (54) inches in length.

18. An apparatus comprising:
a first thin-wall metal tube having a first outer diameter;
a second thin-wall metal tube having a second outer diameter, the second metal tube matable with the first metal tube, the second outer diameter being smaller than the first outer diameter;
a helically-wound metal spring with an eyelet on one end and a two closed coils on the other end, the metal spring retained inside the first metal tube by a first diameter metal rivet and in the second metal tube by a second diameter metal rivet;
the first metal tube having an end cap on the end opposite the second metal tube;
a third metal tube being an extension tube, the extension tube having an outer diameter equal to the second outer diameter and connected to the second metal tube by an expansion clamp located between the second metal tube and the extension tube; the extension tube having an end cap located opposite the first metal tube; and
a top clamp and a bottom clamp, the top clamp and the bottom clamp each having a triangular protrusion and a triangular channel.

19. An apparatus comprising:
a first thin-wall metal tube having a first outer diameter;
a plastic bushing inserted inside the first metal tube;
a second thin-wall metal tube having a second outer diameter, the second metal tube set partially inside the first metal tube;
a helically-wound metal spring with an eyelet on one end and a two closed coils on the other end, the metal spring retained inside the first metal tube by a first diameter metal rivet and in the second metal tube by a second diameter metal rivet;
the second metal tube having an end cap on the end opposite the first metal tube;
a third metal tube being an extension tube, the extension tube having an outer diameter equal to the first outer diameter and connected to the first metal tube by an expansion clamp located between the first metal tube and the extension tube; the extension tube having an end cap located opposite the first metal tube;
a top clamp, the top clamp being a semi-circle with a plurality of holes located on the exterior of the top clamp and penetrating to the interior;
the bottom clamp being a semi-circle with a plurality of inward-facing threaded screw receivers, said screw receivers being elevated from the interior of the bottom clamp of the expansion clamp, the inward-facing screw receivers capable of being aligned with the plurality of holes located on the top clamp;
a plurality of set screws matable with the plurality of holes located on the top clamp and the plurality of threaded screw receivers located on the bottom clamp and securably mating the top and bottom clamps forming the expansion clamp;
the plurality of holes located on the top clamp comprises four holes;
the plurality of inward-facing threaded screw receivers comprises four threaded screw receivers;
the plurality of set screws comprises four set screws;
the four set screws have Allen wrench heads;
wherein the apparatus is capable of spanning a twelve (12) foot six (6) inch span;
wherein the spring can generate up to 63 in-lb spring force before failure;

wherein none of the first metal tube, second metal tube, and extension tube exceed fifty four (54) inches in length; and wherein the spring has between 45 and 51 coils and the eyelet has a radius of between 2 and 4 millimeters (mm).

* * * * *